(12) United States Patent
Andrew et al.

(10) Patent No.: US 8,637,584 B2
(45) Date of Patent: Jan. 28, 2014

(54) POLYESTER POLYOL-CONTAINING POLYURETHANE SYSTEMS HAVING IMPROVED HYDROLYTIC STABILITY

(75) Inventors: Gary Dale Andrew, Walnutport, PA (US); Juan Jesus Burdeniuc, Colmar, PA (US); Goran Zarkov, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 359 days.

(21) Appl. No.: 11/753,633

(22) Filed: May 25, 2007

(65) Prior Publication Data
US 2008/0293841 A1 Nov. 27, 2008

(51) Int. Cl.
*C08G 18/18* (2006.01)
(52) U.S. Cl.
USPC ............. 521/129; 252/182.24; 252/182.28; 521/128; 521/130; 521/172; 521/173
(58) Field of Classification Search
USPC .................. 521/128, 129, 172, 173, 130; 252/182.24, 182.28
See application file for complete search history.

(56) References Cited

U.S. PATENT DOCUMENTS

| | | | |
|---|---|---|---|
| 3,836,488 A | 9/1974 | Pruitt et al. | |
| 3,975,428 A * | 8/1976 | Blahak et al. | 560/49 |
| 4,143,003 A | 3/1979 | Haas et al. | |
| 4,338,408 A | 7/1982 | Zimmerman et al. | |
| 4,546,167 A | 10/1985 | Chang | |
| 4,582,861 A | 4/1986 | Galla et al. | |
| 5,039,713 A | 8/1991 | Petrella | |
| 5,124,367 A | 6/1992 | Barker et al. | |
| 5,143,944 A | 9/1992 | Savoca et al. | |
| 5,233,039 A | 8/1993 | Listemann et al. | |
| 5,274,114 A | 12/1993 | Weider et al. | |
| 5,302,303 A | 4/1994 | Clatty et al. | |
| 5,374,486 A | 12/1994 | Clatty et al. | |
| 5,508,314 A | 4/1996 | Listemann et al. | |
| 5,512,603 A | 4/1996 | Carr et al. | |
| 5,539,007 A | 7/1996 | Listemann et al. | |
| 5,559,161 A | 9/1996 | Klotz et al. | |
| 5,824,711 A | 10/1998 | Kimock et al. | |
| 5,874,483 A | 2/1999 | Savoca et al. | |
| 6,890,966 B2 * | 5/2005 | Ando et al. | 521/128 |
| 2004/0082465 A1 | 4/2004 | Kiso et al. | |

FOREIGN PATENT DOCUMENTS

| | | |
|---|---|---|
| EP | 1 382 624 A1 | 1/2004 |
| JP | 2001/172355 A1 | 6/2001 |
| JP | 2004/292582 A1 | 10/2004 |
| JP | 2007/077240 A1 | 3/2007 |
| WO | 2005/030824 A1 | 4/2005 |

OTHER PUBLICATIONS

Listemann, M. L., et al., "Amine Catalyst Characterzation by a Foam Model Reaction," Journal of Cellular Plastics, vol. 28, pp. 360-398 (1992).

* cited by examiner

*Primary Examiner* — John Cooney
(74) *Attorney, Agent, or Firm* — Michael K. Boyer

(57) ABSTRACT

An isocyanate reactive composition for making a polyurethane foam includes a tertiary amine urethane catalyst comprising a di(C1-C4)alkyl fatty alkyl amine and a polyester polyol. The use of one or more of fatty alkyl tertiary amine serves to reduce hydrolysis of the polyester polyol in the isocyanate reactive composition.

22 Claims, No Drawings

POLYESTER POLYOL-CONTAINING POLYURETHANE SYSTEMS HAVING IMPROVED HYDROLYTIC STABILITY

FIELD OF THE INVENTION

The invention relates to polyurethane products and methods for producing them. More particularly, it relates to catalysts for improving the hydrolytic stability of certain isocyanate reactive compositions for making polyurethane foams.

BACKGROUND OF THE INVENTION

In molded polyester polyurethane systems or systems using flame retardant, the hydrolytic stability of the system is very important. For example, in spray foams, polyester polyols and flame retardants are used because they can improve the fire performance of the final product but, upon storing a polyester polyol and flame retardant in the presence of water and tertiary amine, decomposition of the polyester to acid and polyol occurs causing the amine to form a salt. The tertiary amine catalyst becomes acid blocked reducing the reactivity of the system, often rendering it unsuitable for use. This problem is particularly serious in spray foams where systems with very high reactivity are required because the reaction mixture is expected to react very fast as it is sprayed over a surface. If the reactivity is decreased, the spraying mass of material cannot adhere to the surface causing it to drip or sag, and solidify at a different location than the spraying point. In addition, due to the high reactivity required in spray foams, high use levels of tertiary amines are required which combined with water present in the systems causes the polyester polyol to hydrolyze much faster than in other polyester systems.

Isocyanate reactive compositions containing polyester polyols for making polyurethane (PU) foam are typically mixed with water, flame retardants, amine catalysts, metal catalysts, surfactants and other additives for making polyurethane foams. Polyester polyol and flame retardants are characterized by their poor hydrolytic stability in such reactive compositions. Their hydrolytic instability is particularly enhanced in the presence of alkali such as tertiary amines which are normally present in the PU systems as catalysts.

The presence of tertiary amine catalysts causes the polyester polyol and flame retardant to hydrolyze to the corresponding glycols and acid causing the acid to neutralize the tertiary amine reducing the overall reactivity of the system which has serious implications on the kinetics and properties of the final product.

BRIEF SUMMARY OF THE INVENTION

In one aspect, the invention provides an isocyanate reactive composition comprising a polyester polyol, water, a catalyst composition comprising at least one particular tertiary amine urethane catalyst and optionally a fire retardant or a Mannich polyol, or both. The composition optionally may also include one or more blowing agents, crosslinkers, additional urethane catalysts and surfactants. The particular tertiary amine is a di(C1-C4)alkyl (fatty alkyl) amine of formula (1)

R1R2NR3     (1)

where R1 and R2 are independently C1-C4 alkyl groups and R3 is a fatty alkyl of C8-C36.

As another embodiment, the invention provides compositions for making polyurethane foam comprising the contact product of an organic polyisocyanate and the isocyanate reactive composition comprising a polyester polyol, water, a catalyst composition comprising one or more tertiary amine urethane catalysts of formula (I) and optionally a fire retardant or a Mannich polyol, or both. In a further aspect the polyurethane foam compositions comprise rigid PU foam compositions. Rigid spray foams contain urethane, urea and isocyanurate linkages. In the present invention, "polyurethane" includes urethane, urea and/or isocyanurate linkages.

In another aspect, the invention provides a method for making a polyurethane foam. The method combines a polyisocyanate and the isocyanate reactive composition comprising a polyester polyol, water, a catalyst composition comprising at least one tertiary amine urethane catalyst of formula (I) and optionally a fire retardant or a Mannich polyol, or both.

The use of the catalyst composition can reduce polyester polyol decomposition (hydrolysis) allowing for more shelf stability. In addition, the catalyst composition can be used to make polyurethane spray foams with low odor and good foam kinetics and physical properties.

The ability to improve hydrolysis stability in conventional and high resilience polyurethane slabstock foams, and flexible molded polyurethane foam, as well as in spray rigid foam, is important.

DETAILED DESCRIPTION OF THE INVENTION

One aspect of the invention relates to tertiary amine catalyst compositions and isocyanate reactive compositions for making polyurethane foams. The catalyst compositions include at least one compound which is a dialkyl(fatty alkyl) tertiary amine. The inclusion of one or more of these tertiary amines serves to reduce hydrolysis of polyester polyols in the isocyanate reactive compositions. The dialkyl(fatty alkyl) tertiary amine compounds may be used in conjunction with conventional urethane catalysts under otherwise conventional conditions to make polyurethane foams. The foams are made by combining at least one polyisocyanate compound, at least one polyester polyol compound, and a urethane catalyst composition comprising at least one dialkyl(fatty alkyl) tertiary amine. A blowing agent is usually included, but need not be.

Fatty Alkyl Tertiary Amine

As used herein, the term "fatty alkyl tertiary amine" means a compound or mixture of compounds according to the formula

R1R2NR3 where R1 and R2 are independently C1-C4 alkyl groups and R3 is a fatty alkyl of C8-C36, especially C10-C22. In another aspect the fatty alkyl is C12-C18. The C1-C4 alkyl groups include methyl, ethyl, n-propyl, isopropyl, n-butyl, sec-butyl, isobutyl and t-butyl. Fatty alky groups include butyric, caproic, caprylic, capric, lauric, myristic, palmitic, stearic, linoleic, myristoleic, palmitoleic, oleic, linoleic, linolenic and ricinoleic.

Suitable for use in the invention are dimethyldecyl amine, dimethyldodecyl amine, dimethyltetradecyl amine, dimethylhexadecyl amine, dimethyloctadecyl amine, dimethylcoco amine, dimethyloleyl amine, dimethylricinoleyl amine, diethyldecyl amine, diethyldodecyl amine, diethyltetradecyl amine, diethylhexadecyl amine, diethyloctadecyl amine, diethylcoco amine, diethyloleyl amine, diethylricinoleyl amine, dipropyldecyl amine, dipropyldodecyl amine, dipropyltetradecyl amine, dipropylhexadecyl amine, dipropyloctadecyl amine, dipropylcoco amine, dipropyloleyl amine, dipropylricinoleyl amine, dibutyldecyl amine, dibutyldodecyl amine, dibutyltetradecyl amine, dibutylhexadecyl amine, dibutyloctadecyl amine, dibutylcoco amine, dibutyloleyl amine and dibutylricinoleyl amine.

The fatty alkyl tertiary amines are commercially available or can be prepared by hydrogenation followed by reductive alkylation of the corresponding fatty nitrites. Fatty nitrites are obtained from the corresponding acids via amidation of their ammonium salts followed by dehydration of amides. The manufacture of the fatty tertiary amines is well known in the art as evidenced by both patent literature and the open literature.

Other Urethane Catalysts

The catalyst compositions in the isocyanate reactive compositions of the present invention in addition to the fatty alkyl tertiary amine also may comprise any urethane catalysts well known in the art, especially other known tertiary amine urethane catalysts.

In one aspect of the invention pertaining to making polyurethane foams, especially spray rigid foams, any gelling and/or blowing catalyst known in the art may be used in combination with the fatty tertiary amine. A gelling catalyst is any tertiary amine catalyst known in the urethane art with an initial selectivity of less than 0.7. A blowing catalyst is any tertiary amine catalyst known in the urethane art with an initial selectivity of greater than 0.7. Catalyst selectivity is defined as the ratio of the rate of blowing (urea formation) to the rate of gelling (urethane formation) [J. Cellular Plastics, Vol. 28, 1992, pp. 360-398].

Thus the catalyst composition comprising the fatty alkyl tertiary amine can also contain one or more tertiary amine gelling and/or blowing catalysts. Suitable gelling catalysts may include, for example, triethylenediamine (TEDA), quinuclidine, pentamethyidipropylenetriamine, dimethylcyclohexyl amine, tris(dimethylaminopropyl)-amine, substituted imidazoles such as 1,2-dimethylimidazole and 1,8-diazabicyclo-[5.4.0]undec-7-ene (DBU), N,N-bis(3-dimethylaminopropyl) N-isopropanol-amine; N,N-dimethylaminoethyl-N'-methyl ethanolamine; N,N,N'-trimethylaminopropyl ethanolamine; N,N-dimethylethanolamine; N,N-dimethyl-N',N'-2-hydroxy(propyl)-1,3-propylenediamine; dimethylaminopropylamine; N,N,N'',N''-tetramethyldipropylene-triamine; N,N-bis(3-dimethylaminopropyl)-1,3-propanediamine; N-dimethylaminopropyl-N-methylethanolamine; substituted quinuclidines (U.S. Pat. No. 5,143,944 and U.S. Pat. No. 5,233,039); substituted pyrrolizidines (U.S. Pat. No. 5,512,603); substituted pyrrolidines (EP 499 873); (N,N-dimethylaminoethoxy)ethanol; methylhydroxyethylpiperazine; bis(N,N-dimethyl-3-aminopropyl) amine; urea compounds of tertiary amines such as N,N-dimethylamino-propyl urea and N,N'-bis(3-dimethylaminopropyl)urea; bis(dimethylamino)-2-propanol; N-(3-aminopropyl)imidazole; N-(2-hydroxy-propyl)-imidazole; and N-(2-hydroxyethyl) imidazole.

Suitable blowing catalysts include but are not restricted to bis(dimethylaminoethyl) ether, pentamethyldiethylenetriamine and related compositions (U.S. Pat. No. 5,039,713, U.S. Pat. No. 5,559,161), higher permethylated polyamines such as permethylated triethylenetetramine (U.S. Pat. No. 4,143,003), and branched polyamines (U.S. Pat. No. 3,836,488), 2-[N-(dimethylaminoethoxyethyl)-N-methylamino] ethanol and related structures (U.S. Pat. No. 4,338,408), alkoxylated polyamines (U.S. Pat. No. 5,508,314), imidazole-boron compositions (U.S. Pat. No. 5,539,007), and aminopropyl-bis(aminoethyl)ether compositions (U.S. Pat. No. 5,874,483 and U.S. Pat. No. 5,824,711); dimethylaminoethoxyethanol; N,N,N'-trimethyl-N'-3-amino-propyl-bis(aminoethyl) ether; and N,N,N'-trimethyl-N'-aminopropyl-bis(aminoethyl) ether.

Trimerization catalysts may be use in combination with the fatty alkyl tertiary amine, especially for spray rigid foam systems, and include any such catalysts known in the art. Specific examples include N-hydroxyalkyl quaternary ammonium carbonylate or carboxylate salts, such as are disclosed in U.S. Pat. No. 4,582,861. Also useful are alkali metal carboxylate salts. One exemplary carboxylate salt is potassium 2-ethylhexanoate, also known as potassium octoate.

For systems other than spray foam systems, some or all of the gelling, blowing, and trimerization catalyst may be "blocked" with (i.e. a salt formed with) a carboxylic acid salt, a phenol, or a substituted phenol, assuming that the catalyst contains amine functionality with which to form a salt to provide for a delayed onset of catalyst activity.

The catalyst compositions may also include other components, for example metal catalysts such as organotin compounds like dibutyltin dilaurate, for example when the desired polyurethane foam is a flexible slab stock.

The amount of fatty alkyl tertiary amine in the isocyanate reactive composition should typically be 0.05 to 20 parts per hundred parts polyol on a weight basis (pphp). More typically, the amount will be 0.1 to 10 pphp, and most typically 0.4 to 5 pphp. The spray foam systems require a higher amount of the fatty alkyl tertiary amine than other foam systems, thus the high upper limit for the fatty alkyl tertiary amine.

In terms of the catalyst composition the fatty alkyl tertiary amine may comprise 100 to 5 wt %, preferably 50 to 10 wt % of such composition. An especially desirable catalyst composition comprises 10 to 40 wt % pentamethyldiethylenetriamine, 20 to 80 wt % tris(dimethylaminopropyl) amine and 10 to 50 wt % fatty alkyl tertiary amine. In another aspect the catalyst composition comprises 15 to 30 wt % pentamethyldiethylenetriamine, 35 to 65 wt % tris(dimethylaminopropyl) amine and 20 to 40 wt % fatty alkyl tertiary amine.

Polyisocyanate

Polyurethanes prepared using the catalyst compositions of this invention may be made from any of a wide variety of polyisocyanates known in the art. Examples of suitable polyisocyanates include hexamethylene diisocyanate (HDI), phenylene diisocyanate (PDI), toluene diisocyanate (TDI), and 4,4'-diphenylmethane diisocyanate (MDI). Especially suitable are the 2,4-TDI and 2,6-TDI individually or together as their commercially available mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates. One example is marketed by Dow Chemical Company under the name PAPI, and contains about 60% of 4,4'-diphenylmethane diisocyanate along with other isomeric and analogous higher polyisocyanates.

Also suitable are "prepolymers" of these isocyanate compounds comprising a partially pre-reacted mixture of a polyisocyanate and a polyether or polyester polyol to convert one or more hydroxyls on the polyester polyol to substituted carbamate groups. Suitable prepolymers derived from polyether and polyester polyols are well known in the art.

Polyols

The present invention pertains to the use of a fatty alkyl tertiary amine-containing catalyst composition for making polyester polyol-based polyurethane foams. Any polyester polyol known in the art can be used, including those produced when a dicarboxylic acid or anhydride is reacted with an excess of a diol. Non-limiting examples include adipic acid or phthalic acid or phthalic anhydride reacting with ethylene glycol or butanediol. However, most common polyester polyols are made from phthalic, isophthalic and terephthalic acids. Esterification of these acids with polyol initiators such as ethylene glycol, diethylene glycol, propylene glycol, dipropylene glycol, butanediol, polyethylene glycols of various molecular weights, glycerin, pentanetriol, and the like can yields polyester polyols with different physical properties, molecular weights and molecular architectures but all characterized by their poor hydrolytic stability. Also, polyester polyols useful in the present invention can be produced by reacting a lactone with an excess of a diol, for example, caprolactone reacted with propylene glycol.

The polyol component of the isocyanate reactive composition may also comprise other polyols known in the art in addition to the polyester polyols. Such other suitable polyols known in the art for making polyurethane formulations catalyzed by the catalyst compositions of the invention include the polyalkylene ether polyols. The polyalkylene ether polyols include poly(alkylene oxide) polymers such as poly(ethylene oxide) and poly(propylene oxide) polymers and copolymers having terminal hydroxyl groups derived from polyhydric compounds including diols and triols, such as for example ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, cyclohexanediol and like low molecular weight polyols.

Amine polyether polyols can also be used in the present invention. These can be prepared when an amine such as, for example, ethylenediamine, diethylenetriamine, tolylenediamine, diphenylmethanediamine, or triethanolamine is reacted with ethylene oxide or propylene oxide.

Mannich polyols are also used in spray foam formulations to increase the reactivity of the system. Mannich polyols are typically prepared by condensation of phenol with formaldehyde in the presence of hydroxyl containing amines such as diethanolamine, ethanolamine and the like.

In another aspect of the present invention, a single high molecular weight polyether polyol, or a mixture of high molecular weight polyether polyols, such as mixtures of different multifunctional materials and/or different molecular weight or different chemical composition materials can be used.

In addition to the base polyols described above, or instead of them, materials commonly referred to as "copolymer polyols" may be included in a polyol component for use according to the invention. Copolymer polyols may be used in polyurethane foams to increase the resistance of the foam to deformation, for example to improve the load-bearing properties of the foam. Depending upon the load-bearing requirements for the polyurethane foam, copolymer polyols may comprise from 0 to about 80 percent by weight of the total polyol content. Examples of copolymer polyols include, but are not limited to, graft polyols and polyurea modified polyols, both of which are known in the art and are commercially available.

Blowing Agents

Polyurethane foam production may be aided by the inclusion of a blowing agent to produce voids in the polyurethane matrix during polymerization. Any blowing agent known in the art may be used. Suitable blowing agents include compounds with low boiling points which are vaporized during the exothermic polymerization reaction. Such blowing agents are generally inert and therefore do not decompose or react during the polymerization reaction. Examples of inert blowing agents include, but are not limited to, carbon dioxide, chlorofluorocarbons, hydrogenated fluorocarbons, hydrogenated chlorofluorocarbons, acetone, and low-boiling hydrocarbons such as cyclopentane, isopentane, n-pentane, and their mixtures. Other suitable blowing agents include compounds, for example water, that react with isocyanate compounds to produce a gas.

Fire Retardants

The most common flame retardants used in PU foam formulations are tris(2-chloropropyl)phosphate (TCPP), tris(2-chloroethyl)phosphate (TCEP), dimethylmethylphosphonate (DMMP), and diethylene glycol (DEG) and propylene glycol (PG) esters of tetrabromophthalic anhydride (ME-TBPA). These flame retardants can exhibit various stages of stability in the isocyanate reactive compositions. Needless to say, other known fire retardants can also be used.

Other Optional Components

A variety of other ingredients may be included in the formulations for making foams according to the invention. Examples of optional components include, but are not limited to, cell stabilizers such as silicones, crosslinking agents, chain extenders, pigments, fillers and combinations of any of these. Suitable chain extenders for use include ethylene glycol, 1,4-butanediol, and combinations of these.

Contact Product

The term "contact product" is used herein to describe compositions wherein the components are contacted together in any order, in any manner, and for any length of time. Combining additional materials or components can be done by any method known to one of skill in the art. Further, the term "contact product" includes mixtures, blends, solutions, slurries, reaction products, and the like, or combinations thereof. Although "contact product" can include reaction products of one or more components with each other, it is not required for the respective components to react with one another.

In the following examples and tables use levels of the components other than the polyols are in pphp (parts by weight per hundred parts polyols) unless indicated otherwise. General exemplary polyurethane formulations containing fatty alkyl tertiary amine catalyst compositions according to the invention may include formulations such as set forth in Tables 1-3.

A general spray rigid foam formulation according to the invention in which the urethane catalyst composition also includes a trimerization catalyst would comprise the following components in parts by weight (pbw):

TABLE 1

Spray Rigid Foam Formulation

| Component | Parts by Wt (pphp) |
|---|---|
| Polyester Polyol | 10-100 |
| Mannich Polyol | 0-90 |
| Polyether Polyol | 0-90 |
| Blowing Agent | 5-40 |
| Silicon Surfactant | 0.2-5 |
| Water | 0-10 |
| Amine Catalyst | 0-20 |
| Metal Catalyst | 0-20 |
| Trimerization Catalyst | 0.1-10 |
| Fatty Alkyl Tertiary Amine Catalyst | 0.05-20 |
| Isocyanate Index (NCO Index) | 80-500 |

Spray rigid foams typically are made using polyester polyols of about 220 to 5000 weight average molecular weight (Mw) and hydroxyl number (OH#) of about 20 to 450.

TABLE 2

Flexible Foam Formulation

| Component | Parts by Wt (pphp) |
|---|---|
| Polyether and Polyester Polyols | 20-100 |
| Co-Polymer Polyol (e.g., styrene-acrylonitrile polyol) | 0-80 |
| Silicone Surfactant | 0.2-2.5 |
| Blowing Agent | 2-4.5 |
| Crosslinker (e.g., diethanolamine) | 0.5-3 |
| Catalyst | 0.1-5 |
| Isocyanate (NCO Index) | 70-115 Index |

TABLE 3

Rigid Foam Formulation

| Component | Parts by Wt (pphp) |
|---|---|
| Polyol | 100 |
| Silicone Surfactant | 0.2-4 |
| Blowing Agent | 2-35 |
| Water | 0-5 |
| Catalyst | 0.1-5 |
| Isocyanate (NCO Index) | 70-300 Index |

Preparation of Foams

Foams may be made according to the methods known in the art using typical polyurethane formulations to which have been added a urethane catalyst composition comprising one or more fatty alkyl tertiary amines.

The amount of polyisocyanate used in polyurethane formulations according to the invention is not limited, but it will typically be within those ranges known to those of skill in the art. Exemplary ranges are given in the Tables, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]×100

In some embodiments of the invention, the fatty alkyl tertiary amine catalyst composition may be combined into a package with one or more polyester polyols, and optionally with one or more blowing agents and/or other additives commonly used in polyurethane formation. Examples of these other optional components have been listed previously, and they do not affect the basic nature of the invention. Such mixtures may subsequently be combined with an organic isocyanate to form a polyurethane foam, again optionally in the presence of other additives known in the art.

In addition to making rigid spray foams, the invention may also be used to prepare flexible slabstock and molded foams and semi-flexible foams, such as are commonly utilized for many applications in the automotive industry (e.g., instrument panels and interior trims).

Example

Hydrolysis Stability Study for Different Amine Catalysts

The following isocyanate reactive, or B-side premix, composition was used to compare the impact that various urethane catalysts had on the hydrolysis stability of the polyester polyols. The premix compositions were stored at 120° C. and samples were taken every seven days to determine the acid content. The acid content was determined by solubilizing samples in a 1:1 mixture of toluene and ethanol. Acid number values were determined in duplicate by titration using potentiometric titrations. A Metrohm 835 Titrando and a Metrohm Solvitrode pH electrode were used for the acid number potentiometric titrations. The titrant was 0.1N methanolic potassium hydroxide using a 5 ml burette.

Premix Composition

| Component | pphp* |
|---|---|
| Polyester Polyol (OH# = 304) | 50 |
| Mannich Polyol (OH# = 465) | 50 |
| Flame Retardant (TCPP) | 21.5 |
| Surfactant (Dabco DC193) | 1.39 |
| Catalyst | Varied |
| Water | 3.06 |

*Parts per Hundred Polyol (wt)

The following components were used
TCPP—tris(2-chloropropyl)phosphate
DMEA—dimethylaminoethanol
PC-5—pentamethyldiethylenetriamine
PC-9—tris(dimethylaminopropyl) amine
B-16—dimethyloleyl amine
PC-30—blend of 20 wt % PC-5, 55 wt % PC-9, 25 wt % B16

TABLE 4

| Days | DMEA 2.78* | DMEA 1.39* | PC-5 1.39* | PC-9 1.39* | B-16 1.39* | PC-30 1.39* |
|---|---|---|---|---|---|---|
| 0 | 0.655 | 0.638 | 0.624 | 0.608 | 0.608 | 0.604 |
| 7 | 2.990 | 2.325 | 1.517 | 1.640 | 1.272 | 1.537 |
| 14 | 5.592 | 4.037 | 2.404 | 2.615 | 1.990 | 2.509 |

*pphp

Table 4 shows the values of the acid numbers of the compositions prepared with different catalysts over a period of two weeks. The higher the acid number the more hydrolysis has occurred in the composition because acidity is formed by polyester polyol hydrolysis. After 24 days DMEA, an industry standard for making spray foam, showed the largest acid number and the B-16 fatty alkyl tertiary amine showed the lowest indicating the greatest hydrolysis stability of the amine compositions tested. The PC-30 composition comprising B-16 dimethyloleyl amine showed reduced hydrolysis compared to DMEA and also afforded good foam rate of rise kinetics.

The invention claimed is:

1. An isocyanate reactive composition comprising at least one polyester polyol, at least one Mannich polyol, water and a urethane catalyst composition comprising dimethyloleyl amine.

2. The composition of claim 1 further comprising a fire retardant.

3. The composition of claim 1 in which the urethane catalyst composition further comprises at least one other tertiary amine urethane catalyst.

4. The composition of claim 1 in which the urethane catalyst composition comprises 10 to 40 wt % pentamethyldiethylenetriamine, 20 to 80 wt % tris(dimethylaminopropyl) amine and 10 to 50 wt % dimethyloleyl amine.

5. A polyurethane foam composition comprising the contact product of a polyisocyanate and an isocyanate reactive composition comprising a polyester polyol, water and a urethane catalyst composition comprising dimethyloleyl amine.

6. The polyurethane foam composition of claim 5 further comprising a fire retardant.

7. The polyurethane foam composition of claim 6 further comprising a Mannich polyol.

8. The polyurethane foam composition of claim 7 in which the urethane catalyst composition comprises at least one other tertiary amine urethane catalyst.

9. The polyurethane foam composition of claim 5 in which the urethane catalyst composition comprises 10 to 40 wt % pentamethyldiethylenetriamine, 20 to 80 wt % tris(dimethylaminopropyl)amine and 10 to 50 wt % dimethyloleyl amine.

10. The polyurethane foam composition of claim 7 comprising one or more blowing agents.

11. A method of making a polyurethane foam, the method comprising combining at least one polyisocyanate and an isocyanate reactive composition comprising at least one polyester polyol, at least one Mannich polyol, at least one flame retardant, at least one surfactant, water and a urethane catalyst composition comprising dimethyloleyl amine.

12. The method of claim 11 wherein the polyester polyol comprises 10-100 pphp of the reactive composition.

13. The method of claim 11 wherein the surfactant comprises a silicon surfactant and the silicon surfactant comprises 0.2-5 pphp of the reactive composition.

14. The method of claim 11 wherein the catalyst composition further comprises at least one member selected from the group consisting of amine catalysts, metal catalysts, and trimerization catalysts.

15. The method of claim 11 wherein the foam has an NCO index of 80 to 500.

16. The composition of claim 1 further comprising at least one member selected from the group consisting of triethylenediamine, quinuclidine, pentamethyldipropylenetriamine, dimethylcyclohexyl amine, tris(dimethylaminopropyl)-amine, 1,2-dimethylimidazole, 1,8-diazabicyclo-[5.4.0]undec-7-ene, N,N-bis(3-dimethylaminopropyl) N-isopropanolamine; N,N-dimethylaminoethyl-N'-methyl ethanolamine; N,N,N'-trimethylaminopropyl ethanolamine; N,N-dimethylethanolamine; N,N-dimethyl-N',N'-2-hydroxy(propyl)-1,3-propylenediamine; dimethylaminopropylamine; N,N,N",N"-tetramethyldipropylene-triamine; N,N-bis(3-dimethylaminopropyl)-1,3-propanediamine; N-dimethylaminopropyl-N-methylethanolamine; (N,N-dimethylaminoethoxy)ethanol; methylhydroxyethylpiperazine; bis(N,N-dimethyl-3-aminopropyl)amine; N,N-dimethylamino-propyl urea, N,N'-bis(3-dimethylamino-propyl)urea; bis(dimethylamino)-2-propanol; N-(3-aminopropyl)imidazole; N-(2-hydroxy-propyl)-imidazole; and N-(2-hydroxyethyl)imidazole.

17. The composition of claim 1 further comprising at least one member selected from the group consisting of bis(dimethylaminoethyl)ether, pentamethyldiethylenetriamine, permethylated triethylenetetramine, 2-[N-(dimethylaminoethoxyethyl)-N-methylamino]ethanol, alkoxylated polyamines, imidazole-boron compositions, aminopropyl-bis(aminoethyl)ether compositions; dimethylaminoethoxyethanol; N,N,N'-trimethyl-N'-3-amino-propyl-bis(aminoethyl)ether; and N,N,N'-trimethyl-N'-aminopropyl-bis(aminoethyl)ether.

18. The composition of claim 1 further comprising at least one member selected from the group consisting of N-hydroxyalkyl quaternary ammonium carbonylate and potassium 2-ethylhexanoate.

19. The composition of claim 1 further comprising at least one amine salt formed with a carboxylic acid salt, a phenol, or a substituted phenol.

20. The composition of claim 1 further comprising at least one member selected from the group consisting of cell stabilizers, crosslinking agents, chain extenders, pigments, and fillers.

21. The composition of claim 20 wherein the chain extenders comprise at least one of ethylene glycol and 1,4-butanediol.

22. The composition of claim 5 wherein the polyisocyanate comprises at least one member selected from the group consisting of hexamethylene diisocyanate, phenylene diisocyanate, toluene diisocyanate, and 4,4'-diphenylmethane diisocyanate.

* * * * *